C. L. GRAVES.
MACHINE FOR AUTOMATICALLY MANUFACTURING WELDED WIRE CHAINS, RINGS, &c.
APPLICATION FILED AUG. 31, 1910.

1,029,865.

Patented June 18, 1912.

WITNESSES:
K. A. Sherwood
M. I. Longan

INVENTOR
Charles L. Graves
ATTORNEY

C. L. GRAVES.
MACHINE FOR AUTOMATICALLY MANUFACTURING WELDED WIRE CHAINS, RINGS, &c.
APPLICATION FILED AUG. 23, 1910.

1,029,865.

Patented June 18, 1912.

WITNESSES:
H. A. Sherwood

INVENTOR
Charles L. Graves
BY
ATTORNEY

C. L. GRAVES.
MACHINE FOR AUTOMATICALLY MANUFACTURING WELDED WIRE CHAINS, RINGS, &c.
APPLICATION FILED AUG. 24, 1910.

1,029,865.

Patented June 18, 1912.

1,029,865. MACHINE FOR AUTOMATICALLY MANUFACTURING WELDED WIRE CHAINS, RINGS, &c. CHARLES L. GRAVES, Milford, Conn., assignor to The Automatic Welding Machine Company, Bridgeport, Conn., a Corporation of Connecticut. Filed Aug. 23, 1910. Serial No. 578,529.

*To all whom it may concern:*

Be it known that I, CHARLES L. GRAVES, a citizen of the United States, residing in the town of Milford, county of New Haven, and State of Connecticut, have invented certain new and useful Improvements in Machines for Automatically Manufacturing Welded Wire Chains, Rings, &c.; and I do declare the following to be a full, clear, and exact description of the invention, such as will enable others skilled in the art to which it appertains to make and use the same.

My invention relates to certain improvements in machines for manufacturing welded wire chains, but more particularly refers to machines of this description that are constructed and operated so as to form a lap weld at the side of the chain links, and not at the ends thereof.

The object of my invention is to produce a machine that will automatically form and weld the links, connect a partially formed link with a previously completed link without any twisting of the links, and compress the links at their welded points so as to eliminate all undue roughness incident to the welding, and with these ends in view my invention consists in the details of construction and arrangement of parts hereinafter referred to and then particularly pointed out in the claims which conclude this description.

Figure 1:
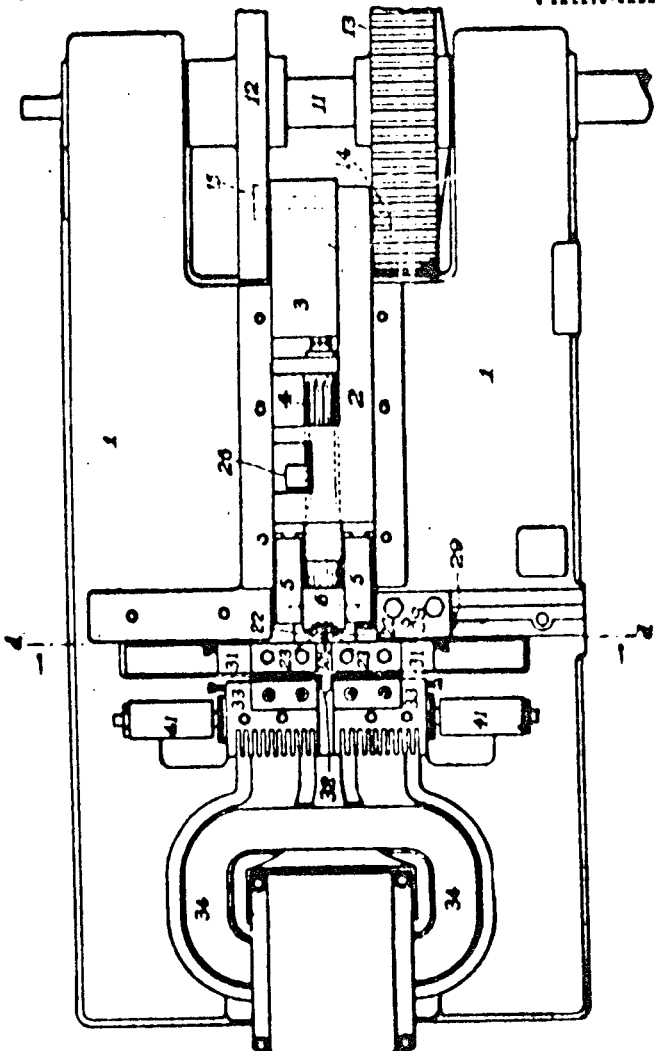
Figure 2:
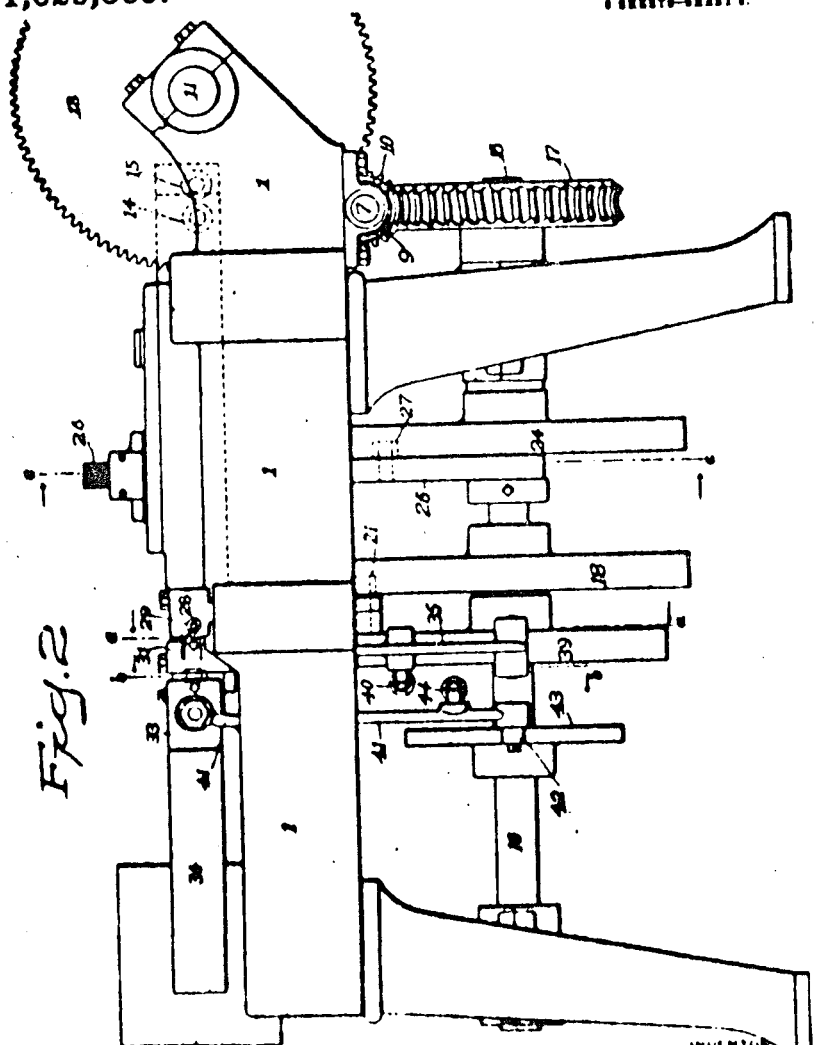
Figure 3:
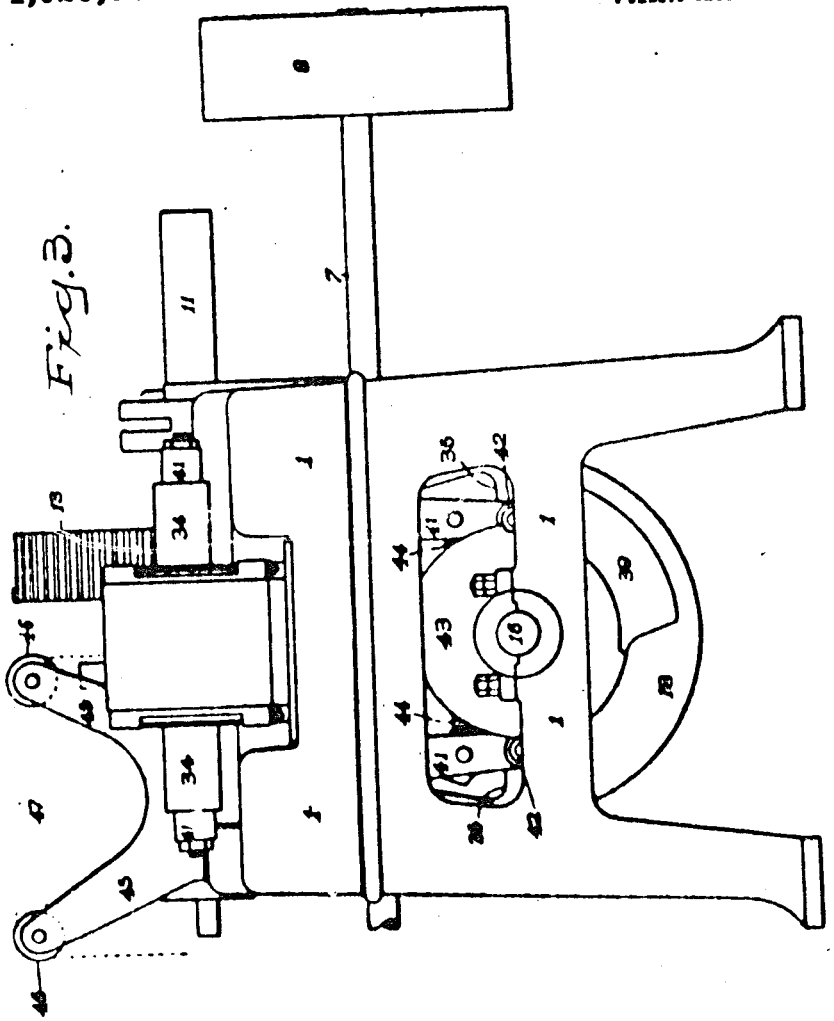
Figure 4:
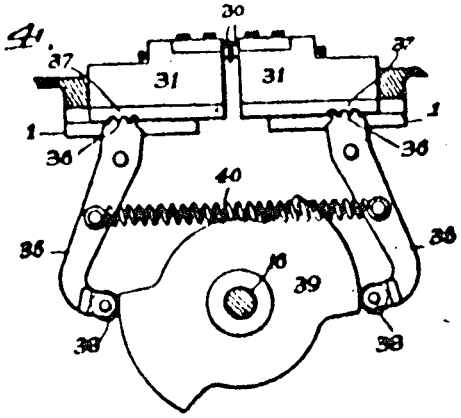
Figure 5:
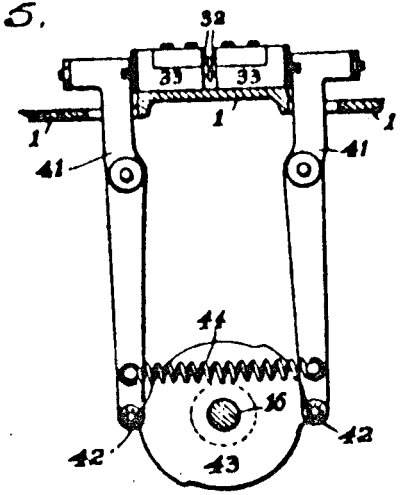
Figure 6:
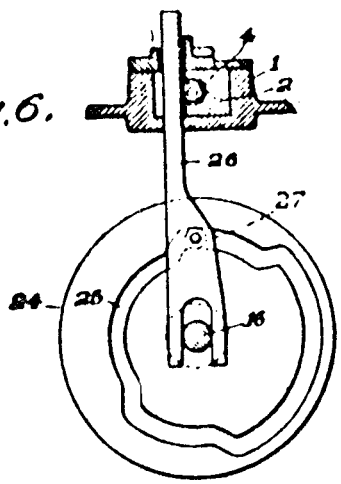
Figure 7:
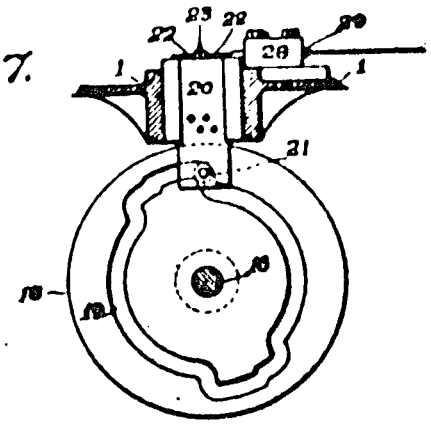

In the accompanying drawing Figure 1 is a plan view of my improved machine—Fig. 2 a side elevation—Fig. 3 a front end view—Fig. 4 a section at the line *a, a*, of Fig. 2—Fig. 5 a section at the line *b, b*, of Fig. 2—Fig. 6 a section at the line *c, c*, of Fig. 2—Fig. 7 a section at the line *d, d*, of Fig. 1, and Figs. 8, 9, 10, and 11, detail broken plan views showing particularly the position of the several instrumentalities immediately associated with the wire in performing the various operations in the formation of the link, connecting a partially formed link with a previously completed link, and delivering the links to the welding devices and to the forming grippers.

Similar numerals of reference denote like parts in the several figures of the drawing.

In my pending application Serial No. 515,754, filed Sept. 2, 1909, I showed and described a machine for making welded wire chain in which the weld was at the ends of the links while the latter when held at the welded end were twisted so as to bring the rear portions of the links in a vertical plane preparatory to receiving the ends of a subsequent link. In my present improvement the weld is at the sides of the links, and the links are not twisted but are merely turned from a horizontal plane to a vertical plane preparatory to receiving subsequent partially formed links, all of which will be clear from the following description.

The actual tools or devices which are immediately associated with the link blanks in the manufacture of the completed chain receive proper movements from suitable levers, cams, racks and pinions and the like, which are very ordinary in their construction and operation and do not require any particular description and therefore I will merely refer to such parts briefly confining my specific descriptions to the devices and operations that are closely related to the wire itself.

1 is the frame of the machine and 2 is the primary slide adapted to reciprocate within any suitable ways in the bed of said frame.

3 is the secondary slide movable in ways within the slide 2 so that it will be understood that these slides have independent movements. Journaled within the slide 3 in any suitable manner is an elongated rotary pinion 4 which is carried by said slide in its lengthwise movements but is capable of a free independent rotary movement.

5 are the primary bending tools carried by the forward end of the slide 2, and 6 is the secondary bending tool carried by the forward extremity of the pinion 4.

7 is the power shaft suitably journaled within the frame of the machine and carrying the power pulley 8, worm 9, and spur gear 10.

11 is a shaft journaled in the frame of the machine and carrying cam wheel 12 and large gear 13 which latter meshes with the spur 10 whereby movement is communicated from the power shaft to the shaft 11. Within the sides of the gear 13 and wheel 12 are cam grooves (not shown) within which extend rolls 14, 15, shown in dotted lines, that are carried by the rear extremities of the slides 2, 3, whereby the proper motions are imparted to these slides.

16 is a shaft journaled within the frame of the machine, and extending at right angles to the power shaft 7, and carrying at one extremity a worm wheel 17 which is in mesh with the worm 9 whereby rotation will be given to this shaft 16.

18 is a cam wheel carried by the shaft 16 and having in its side a groove 19, and 20 is a vertical slide adapted to move in ways in the bed of the machine and carrying at its lower end a roll 21 (shown in dotted lines) which extends within the groove 19, whereby movements are imparted to this slide for the purpose presently to be explained. 22, 23, are pins which project upwardly from the top of the slide 20 and constitute the mandrels around which the several bending operations are performed. These mandrels are four in number, the outer ones 22 being shorter than the inner mandrels 23 for the purpose presently to be explained. Likewise carried by the shaft 16 is a cam wheel 24 having therein a groove 25, and 26 is a rack bar normally engaging the pinion 24, and provided with a roll 27 (shown in dotted lines) which extends within the groove 25, whereby said rack bar may be given a vertical reciprocatory movement so as to rotate said pinion.

28 is an anvil block secured to the frame of the machine and having secured therein a quill 29 through which the wire for the chain is fed, the neighboring bending tool 5 being so formed that it will operate as a cutter to sever the wire blanks at its initial forward movement, all of which is quite ordinary and requires no detail description.

Immediately beyond the slide 20 are gripper formers 30 that are suitably secured within slidable blocks 31 guided in suitable ways within the bed of the machine, and immediately beyond these formers are the welding electrodes 32 that are likewise secured to slidable blocks 33 adapted to move in suitable ways in the bed of the machine, and 34 are electrical conductors extending through and supported by the usual core and properly connected with the electrodes.

I have not illustrated any current wires or any manner of connecting the electrodes since these features are very ordinary and well known and form no part of my present invention.

35 are levers pivoted to the frame of the machine and formed into gear segments 36 at the upper extremities and adapted to engage with short racks 37 formed in the under portions of the blocks 31, the lower ends of these levers being equipped with rolls 38 which engage a cam 39 carried by the shaft 16, a spring 40 having its ends secured to said levers serving to keep these rolls in contact with the cam so that as the latter revolves proper sliding movements will be given to the blocks 31 whereby the formers 30 may be closed or opened as the occasion may demand.

41 are levers pivoted to the frame of the machine and carrying at their lower extremities rolls 42 which engage cam 43 on the shaft 16 and are maintained in such engagement by means of the spring 44 whose ends are secured to said levers, the upper extremities of the latter being suitably engaged with the blocks 33, whereby the movements of this cam 43 will control the opening and closing of the electrodes.

After a blank has been cut off by the initial movement of the primary slide 2 the latter in its further advance will bend the extremities of the blank around the outer mandrels 22, and immediately thereafter the slide 20 will be slightly lowered and the secondary slide 3 will now be operated to finally bend the blank around the inner mandrels 23, the lowering of the outer mandrels 22 by the movement of the slide 20 being necessary in order that the secondary slide 3 may clear them. As the slide 3 performs this final bending operation it will jam the newly formed link against the sides of the gripper formers 30 thereby imparting a final "set" to the links, and the secondary bending tool 6 will then be given a quarter turn by the action of the rack bar 26, thus bringing the newly formed link to a vertical plane, after which the welding and gripping takes place.

Figure 8:
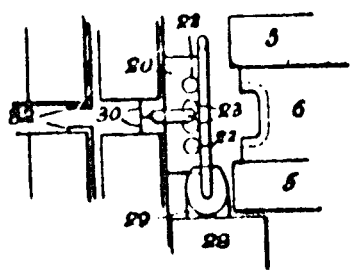
Figure 9:
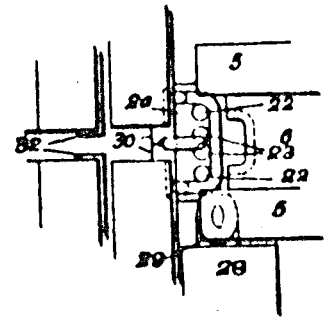
Figure 10:
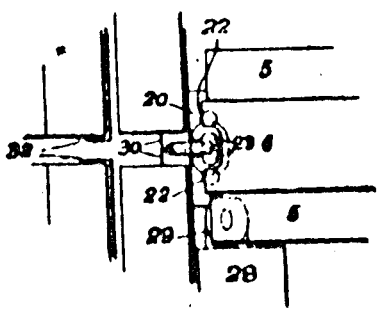
Figure 11:
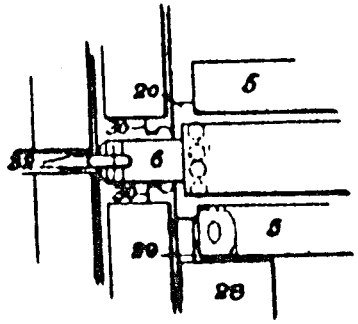

Referring more particularly to Figs. 8, 9, 10, and 11, the operation of the parts in their proper sequence is as follows:—Presupposing a previously welded link to be held in vertical position between the gripper formers 30, as shown at Fig. 8, the primary slide first advances, severs the blank and bends the ends thereof around the outer mandrels as shown at Fig. 9; the slide 20 now operates to withdraw the outer mandrels and the secondary slide 3 advances and finally bends the blank around the inner mandrels and simultaneously connects the newly formed link with the link held between the gripper formers, as shown at Fig. 10; the gripper formers are now withdrawn and the welded link discharged therefrom, and the secondary bending tool 6 is then revolved a quarter turn and advances to bring the newly completed link between the electrodes, as shown at Fig. 11, and after the welding operation the secondary slide is retracted until the newly completed and welded link is between the gripper formers whereupon the latter are operated to grip the link in its welded part and thereby impart a proper smoothness and finish thereto, and the link is then held, as shown at Fig. 8, between these grippers preparatory to the formation of the next link. The extremities of the link are brought together and subsequently welded at the side of the link and not at the end, so that, after the link has been turned to a vertical plane the previously completed link will readily drop out of the way and be suspended from the end of the newly formed link so that the side of the latter is perfectly free to be presented both to the welding electrodes and to the gripper formers.

There is no twisting whatever of the links, and the provision of the special grip formers insures uniformity in appearance at the welded portions.

As I said before, it is not deemed necessary to go into any detail explanation of the operation of the several cams, levers, rack and pinion and the like, since these elements operate in the usual manner to bring about the sequence of operations required.

If desired, any suitable bracket 45 may be bolted to the frame of the machine and provided with pulleys 46 over which the completed chain may be led as shown at Fig. 3, where the dotted line 47 represents the chain.

My improvement may also be utilized for the purpose of manufacturing welded rings, or the links themselves may be welded and not connected together since there is a commercial use for welded links separately, and in this instance it would not be necessary that the secondary slide should have any rotary movement, because provision would not have to be made for connecting the blank for a subsequent link with a previously completed link.

Having thus described my invention what I claim as new and desire to secure by Letters Patent is:—

1. In a machine for automatically making welded wire articles, the combination with the welding devices and the gripper formers, of mechanism for forming the article from a blank with the ends meeting at one side of the article and subsequently inserting said article first between the welding devices and afterward between the gripper formers.

2. In a machine for automatically manufacturing welded wire chain, the combination of a vertical slide carrying outer and inner mandrels of different heights, a primary horizontal slide for cutting off the blanks and bending the ends of the latter around the outer mandrels, means for depressing said vertical slide to withdraw the outer mandrels, a secondary horizontal slide for finally bending and forming the partially completed link around the inner mandrels and simultaneously connecting said link with a previously completed link, welding devices to which the partially completed link is delivered by the partial advancement of said secondary slide, a pair of gripper formers for shaping the welded portions of a completed link and holding said link in position to receive the partially completed link, and means for operating said slides in a cycle of operations.

3. In a machine for automatically making welded wire chain, the combination with welding devices adapted to receive and weld the ends of a partially formed link and a pair of gripper formers adapted to receive and shape the completed welded link and to hold the same in position to receive the ends of a succeeding partially formed link, of mechanisms for forming said succeeding link from a blank and connecting it with a previously completed link, for bodily turning said succeeding link a quarter turn and delivering it to the welding devices and for withdrawing said link from the welding devices and delivering it between the gripper formers.

4. In a machine for automatically making welded wire chain, the combination of welding devices and means for operating them, gripper formers that receive and shape a completed welded link and hold the latter in position to receive the ends of a newly partially formed link, means for operating said formers, a vertical slide carrying vertical mandrels around which the link blank is bent and formed, primary and secondary slides carrying forming tools adapted to coöperate with said mandrels in forming a succeeding link and connecting it with a previously completed link held by the gripper formers, and means for operating said vertical, primary and secondary slides in a proper sequence whereby the blank is formed into a partially completed link around said mandrels, the latter withdrawn the link then given a quarter turn and delivered to the welding devices, the latter relaxed and the completed welded link delivered to the gripper formers.

5. In a machine for automatically making welded wire chain, the combination with the welding devices and the gripper formers, of mechanisms for forming a link from a blank with the ends meeting at one side of the link, turning the link bodily and then inserting it first between the welding devices and afterward between the gripper formers, and means for operating said mechanisms in the sequence described.

6. In a machine for automatically making welded wire chain, the combination of welding instrumentalities, gripper formers, a vertical movable slide carrying four transversely alined vertical mandrels the two inner mandrels being longer than the outer mandrels, primary and secondary slides which operate to bend and form a succeeding link around said mandrels and to connect said link with a previously welded and completed link held between the gripper formers, and mechanisms for operating said instrumentalities, formers and slides in a cycle of operations, whereby the blank for a succeeding link is primarily bent around the outer mandrels the latter withdrawn and the final bending and connecting with a previously completed link effected around the inner mandrels the latter withdrawn and the partially formed link turned bodily and delivered between the welding instrumentalities and welded and released and finally delivered to and held by the gripper formers in completed form in position to receive the ends of a succeeding link.

7. In a machine for automatically making welded wire chain, the combination with the welding devices and the gripper formers, of mechanisms for forming the link from a blank with the ends meeting at one side of the link, for forcing the ends against the sides of the formers whereby the link is set, for turning the link bodily and then inserting it first between the welding devices and afterward withdrawing it and inserting it between the gripper formers, whereby the link is finished at its welded portions, and means for operating said mechanisms in the sequence described.

8. In a chain-making machine, the combination of a vertically reciprocating block provided with three bending abutments rigidly secured thereto and comprising a comparatively long vertical pin to engage a blank centrally and with two comparatively short pins to engage the blank at the ends, horizontally reciprocating bending means, means for delivering a blank between the pins and said means, mechanism for advancing the bending means to bend first the ends and then the middle of the blank against the pins on said block, and means for retracting the block after the end bending operation sufficiently to disengage the end bending pins from the blank before it is bent around the longer central pin.

9. In a chain-making machine, the combination with a suitable frame, of a pair of plungers adapted to reciprocate horizontally toward and from each other in order to hold a link, link-forming mechanism for bending a blank into a link and passing its ends through the previously formed link held by said plungers; and means for operating said plungers at definite times with respect to said link-forming mechanism, to release said previously formed link when the newly-formed link is joined to it.

In testimony whereof I affix my signature in presence of two witnesses.

CHARLES L. GRAVES.

Witnesses:
F. W. SMITH, Jr.,
M. T. LONGDEN.